United States Patent
Nissan et al.

(10) Patent No.: US 9,058,470 B1
(45) Date of Patent: Jun. 16, 2015

(54) ACTUAL USAGE ANALYSIS FOR ADVANCED PRIVILEGE MANAGEMENT

(71) Applicant: CA, Inc., Islandia, NY (US)

(72) Inventors: Yuval Nissan, Tel Aviv (IL); Ron Marom, Givataim (IL)

(73) Assignee: CA, Inc., New York, NY (US)

( * ) Notice: Subject to any disclaimer, the term of this patent is extended or adjusted under 35 U.S.C. 154(b) by 171 days.

(21) Appl. No.: 13/783,742

(22) Filed: Mar. 4, 2013

(51) Int. Cl.
*G06F 21/31* (2013.01)
*G06F 21/30* (2013.01)
*G06F 21/55* (2013.01)
*G06F 21/36* (2013.01)

(52) U.S. Cl.
CPC .............. *G06F 21/30* (2013.01); *G06F 21/554* (2013.01); *G06F 21/316* (2013.01); *G06F 21/36* (2013.01)

(58) Field of Classification Search
None
See application file for complete search history.

(56) References Cited

U.S. PATENT DOCUMENTS

| 2002/0091947 | A1* | 7/2002 | Nakamura | 713/202 |
| 2012/0222132 | A1* | 8/2012 | Burger et al. | 726/28 |
| 2013/0047149 | A1* | 2/2013 | Xu et al. | 717/175 |
| 2014/0208390 | A1* | 7/2014 | Brown et al. | 726/4 |

OTHER PUBLICATIONS

Iris Flowers Clustering, http://upload.wikimedia.org/wikipedia/commons/1/10/Iris_Flowers_Clustering_kMeans.svg accessed Mar. 4, 2013, 1 page.

* cited by examiner

*Primary Examiner* — Saleh Najjar
*Assistant Examiner* — Jason Plotkin
(74) *Attorney, Agent, or Firm* — Myers Bigel Sibley & Sajovec, P.A.

(57) ABSTRACT

Methods and computer program products for analyzing privilege usage are disclosed. Event information is identified for each user, including a list of events and a count of each listed event. Privilege information of each user is identified, including a list of privileges of the user. The event information and privilege information of users with similar events are compared. Events are mapped to privileges based on the comparison to generate an event-privilege mapping. Users with similar counts for similar events may be used for comparison. A computer system is disclosed that includes an event identifier, a privilege identifier and an event-privilege mapper.

20 Claims, 9 Drawing Sheets

US 9,058,470 B1

ACTUAL USAGE ANALYSIS FOR ADVANCED PRIVILEGE MANAGEMENT

BACKGROUND

The present invention relates generally to information technology and more particularly, to systems for managing user privileges on computer systems.

Log management systems are often employed by software and network administrators to track user events on corporate networks and workstations. User events may include instances in which a user accesses or uses a resource of an organization. Such resources may include data files or directories, physical systems, equipment, locations or any other asset. Currently, event details from log management systems are not shared with any user privileges, or rights granted to a user to access resources. Consequently, when an event is logged by the log management system, the event is not correlated with a specific privilege that was used to cause the event.

It can be difficult to determine what privileges are associated with each of the events. In some situations, multiple privileges are used to perform a single action. Alternatively, a single privilege may allow multiple actions. Furthermore, log management systems and privilege management systems may be deployed in different environments, monitor events differently and use different privileges. Different clients may have their own unique names for privileges even when referring to the same capability. Various clients may also log actions using different settings. Thus, it is a tedious manual process for software and network administrators to identify privileges associated with user events.

BRIEF SUMMARY

Systems, methods and computer program products for analyzing privilege usage are disclosed. According to an aspect of the disclosure, event information is identified for each user, including a list of events and a count of each listed event. An event may be a recorded user action on a computer system. Privilege information of each user is identified, including a list of privileges of the user. A privilege may be a computer setting indicating what access or control of a computer system is available to a respective user. Users of the plurality of users with similar events are identified. Events are determined to be similar when the events have common characteristics that satisfy rules for determining similarity. The event information and privilege information of the users with similar events are compared. Events are mapped to privileges based on the comparison of the event information and privilege information. Similar counts for the similar events may also be used for comparison. Counts may be determined to be similar when a count value falls within a value range of another count value.

In another aspect, an event vector is defined for each user, wherein each dimension of the event vector corresponds to a listed event identified for the respective user and a value of the dimension is the count of the listed event. A privilege vector is also defined for each user, wherein each dimension of the privilege vector corresponds to a listed privilege identified for the respective user. The event vectors are distributed in an event space and the privilege vectors are distributed in a privilege space. Event analysis is performed, wherein for each iteration of the event analysis, events of the event vectors are analyzed for similarities and event vectors having similar events and similar event values are converged. Privilege analysis is also performed, wherein for each iteration of the privilege analysis, privileges of the privilege vectors are analyzed for similarities and privilege vectors having similar privileges are converged. When event vectors cluster in the event space and privilege vectors cluster in the privilege space, intersections of the event clusters and privilege clusters are determined. These intersections are used to map a respective event of an event cluster to a respective privilege of an intersecting privilege cluster.

According to a further aspect, a respective event of an event cluster is mapped to a respective privilege of a privilege cluster that intersects the event cluster for intersections that have a number of event vectors and a number of privilege vectors in a respective intersection that satisfy an intersection vector number threshold.

According to a further aspect, a common title is defined of users associated with both the event cluster and the privilege cluster of a respective intersection, and the common title is mapped to privileges common to all users in the intersecting privilege cluster of the respective intersection.

Some other embodiments are directed to related methods, systems and computer program products.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

The terminology used herein is for the purpose of describing particular embodiments only and is not intended to be limiting to other embodiments. As used herein, the singular forms "a", "an" and "the" are intended to include the plural forms as well, unless the context clearly indicates otherwise.

It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It can be difficult to determine what privileges are associated with logged user events. Event details from the log management system are not shared with any user privileges. Consequently, when an event is logged by the log management system, the event is not correlated with a specific privilege that was used to cause the event.

Systems, methods and computer program products for privilege usage analysis are disclosed. Embodiments described herein may be used to correlate user privileges with events. This may provide business professionals who need to review access privileges, such as compliance certifiers, with computer system usage information at the individual privilege level. This allows for a more granular analysis. Such an analysis may assist professionals with deciding how to administer privileges to users.

Figure 1:
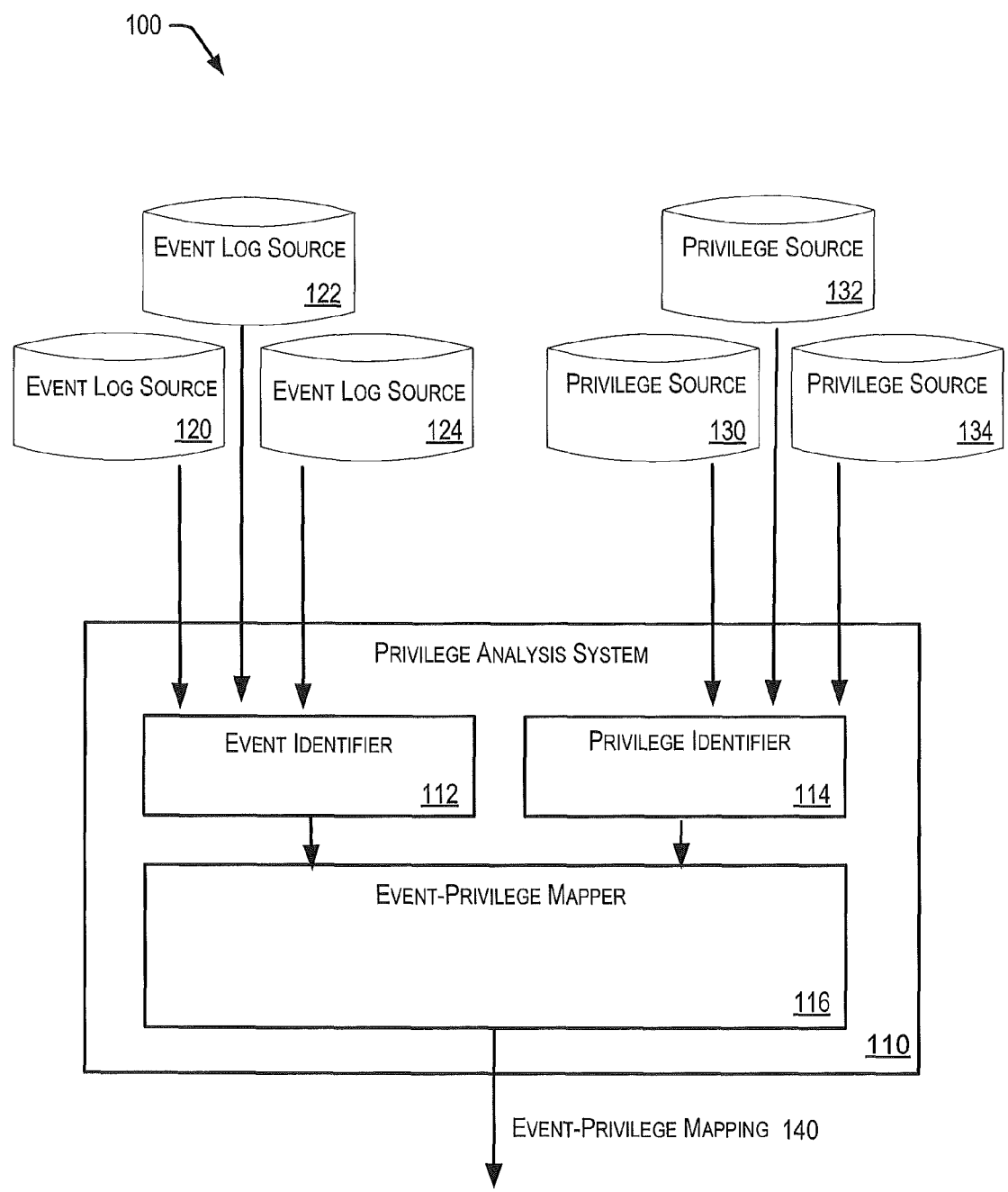
FIG. 1 is a block diagram of an example system for analyzing privilege usage.

FIG. 1 illustrates an example system 100 for analyzing privilege usage. System 100 may include privilege analysis system 110. According to an embodiment, privilege analysis system 110 is coupled to event log sources 120-124 and privilege sources 130-134, either directly or indirectly over a network. Such a network may facilitate wireless or wireline communication, and may communicate using, for example, IP packets, Frame Relay frames, Asynchronous Transfer Mode (ATM) cells, voice, video, data, and other suitable information between network addresses. The network may include one or more local area networks (LANs), radio access networks (RANs), metropolitan area networks (MANS), wide area networks (WANs), all or a portion of the global computer network known as the Internet, and/or any other communication system or systems at one or more locations.

Event log sources 120-124 and privilege sources 130-134 may also be located on the same computing device(s) as privilege analysis system, but in different data partitions, files or representations.

Privilege analysis system 110, or any combination of components of system 110, may be software, firmware, or hardware or any combination thereof in a computing device. Computing devices generally refer to any computer system capable of implementing managed machines, which may include, without limitation, a mainframe computer platform, personal computer, mobile computer (e.g., laptop, smart phone, tablet computer, navigation device), server, set-top box, wireless communication terminal (e.g., cellular data terminal), embedded system or any other appropriate program code processing hardware.

Privilege analysis system 110 includes event identifier 112, privilege identifier 114 and event-privilege mapper 116. Event identifier 112 receives or obtains event log details from one or more event log sources, such as from event log sources 120-124. Event log sources 120-124 may be log databases, file systems, data streams or any other entity that generates, returns, stores, or transmits details about user events for a plurality of users. Event details may be retrieved or organized in an event to user relationship. Login names may be correlated with business users.

Event identifier 112 identifies event information of each user of the plurality of users. Event information comprises a list of events for each user. An event may be a recorded user action on a computer system. Such events may include, for example, resource usage, accesses, attempts to use or access, data additions, modifications, deletions, or any other operations on or in a computer system. The events for each user may be collected into an actual or virtual list of events. The list of events may include one or more events.

The event information may also comprise a count of each listed event. Each unique event in a list of events recorded for a user may be counted. For example, three events may be observed, including: access resource A; message sent to user 2; and access resource A. The list of events includes "access resource A" and "message sent to user 2". As "message sent to user 2" is identified as occurring once, the count for the event is 1. As "access resource A" is identified as occurring twice, the count for that event is 2. Other information such as additional user, event or system details may be included in the event information. Event details may be labeled, recorded, configured or logged differently by different clients or institutions. Some events, though not labeled exactly the same, may be similar in operation.

Privilege identifier 114 receives or obtains privilege details for users from one or more privilege sources, such as from privilege sources 130-134. Privilege log sources 130-134 may be user databases, files, data streams or any other entity that generates, returns, stores, or transmits details about privileges for the plurality of users. Privilege details may be retrieved or organized in a privilege to user relationship.

Privileges may vary from client to client. A privilege may be a computer setting indicating what access or control of a computer system is available to a respective user. Privileges may include, for example, read only permission settings for low level staff, write and modification settings for employees performing substantial work, directory and override permissions for supervisory or managerial staff, special settings for maintenance or administration and super settings for a few special operators.

Privilege identifier 114 identifies privilege information of each user of the plurality of users. The privilege information comprises a list of privileges of the user. In some cases, privileges may be embedded in and extracted from user roles or existing privilege roles. Roles may be more general categories of privileges or permission settings. Roles may reflect social or organizational relationships and involve job or membership titles. For example, a "manager" role may establish a subset of privileges that have more capabilities than a subset of privileges assigned to an "employee" role. Roles may also define relationships between sets of data, between users, between resources or any combination of the aforementioned.

Event-privilege mapper 116 maps events to privileges. This may be done in a number of ways. According to one aspect, event-privilege mapper 116 compares the event information and the privilege information of users with similar events. Similar events may be events close in function and effect although different in name or details. For example, one event may be "delete record from employee database B" while another event may be "remove record from worker database C". Although different event log sources may record events of different name, such events may be considered similar.

Events may be determined to be similar when the events have common characteristics that satisfy rules for determining similarity. Common characteristics may include common names, common functions, common expected or actual results, etc. Rules for determining similarity may be used. For example, a rule may determine events to be similar if both events have an event name that exists in a grouping of common event names. In another example, a similarity rule may determine similarity if events involve use of the same type of resource, though named differently. Similarity rules may also look for a pattern of matching field types in a set of returned results from an event. In other cases, similarity may also be determined using predefined or learned hashes, tables, dictionaries or maps. Similarity may also be inferred by other contextual clues. Similarity may be determined by additional methods or rules common to those skilled in the art.

Based on the comparison of the event information and the privilege information of users with similar events, event-privilege mapper 116 maps events to privileges. This may result in the generation of an event-privilege mapping 140. Event-privilege mapping 140 may be a conceptual relationship between one or more events and one or more privileges. Mapping 140 may also be a data set, table, hash or other representation that is output, displayed or stored.

Figure 2:
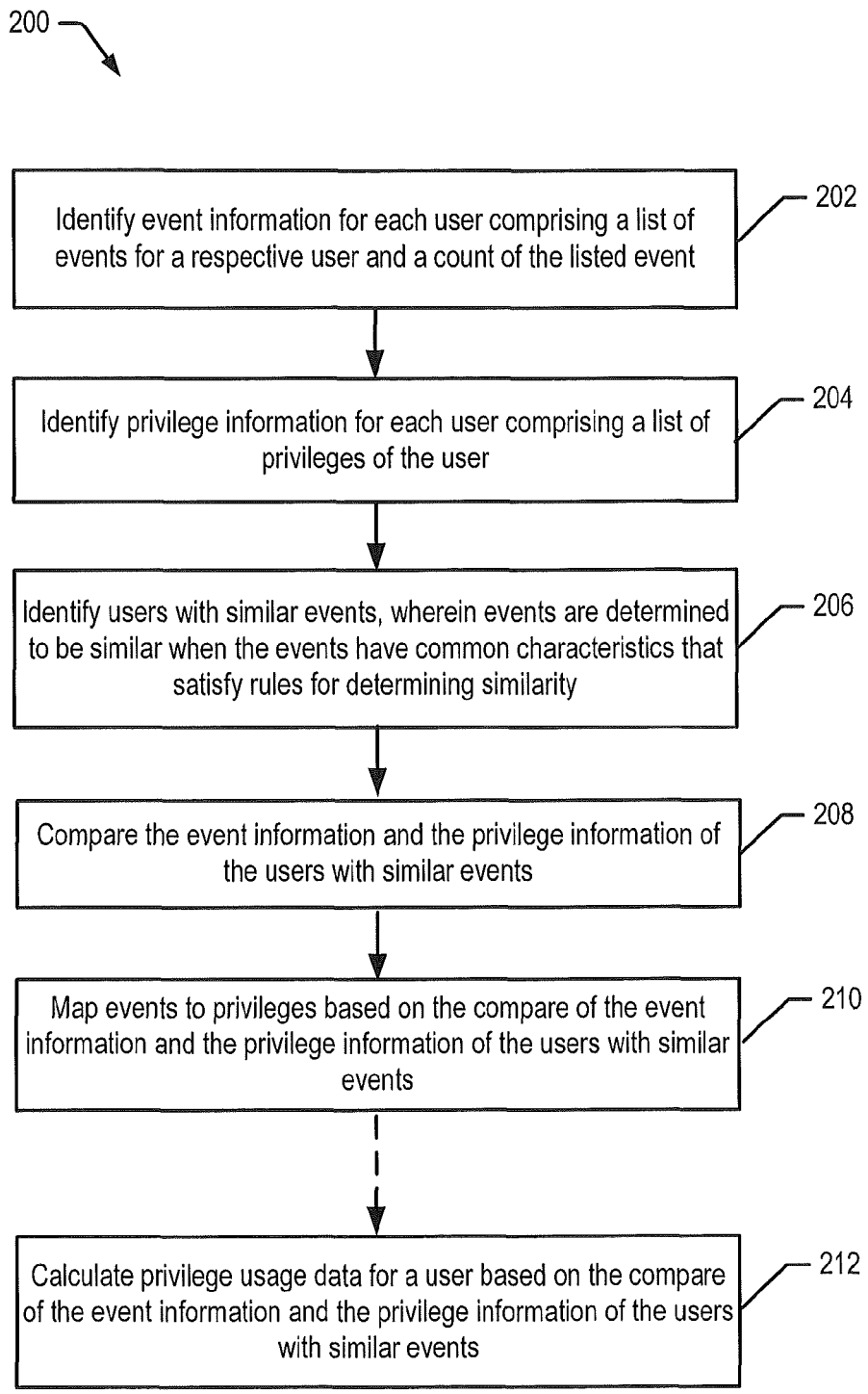
FIGS. 2-5 are flowcharts illustrating example methods for analyzing privilege usage.

These and other more generalized operations and methods are illustrated by method 200 in the flowchart of FIG. 2, which may be performed by privilege analysis system 110. Numerical representations or other symbolic representations of the categories can be substituted. In block 202 of FIG. 2, event information is identified for each user. The event information comprises a list of events for the user. Same or similar events can be consolidated and represented by a single event. In doing so, the count of the number of times the event is logged may be recorded with the event information. Event identifier 112 performs this block.

Privilege information is identified for each user (block 204 of FIG. 2). The privilege information comprises privileges of the user. Privilege information may also include a time period of the privilege, in the case that privileges have changed for the user. Such time periods may be used in concert with any related time information for events in the event information when matching events to privileges. Privilege identifier 114 performs this block.

Figure 3:
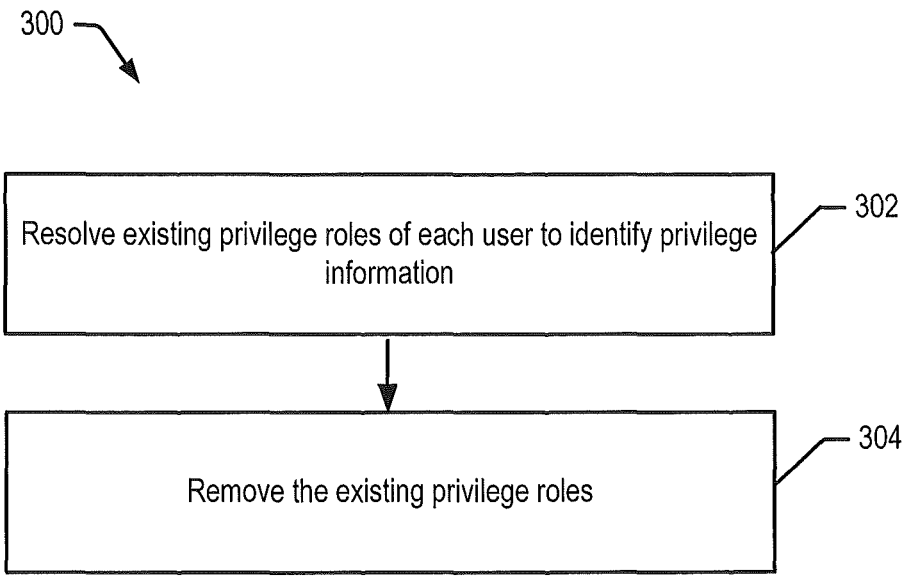

Roles for users may also be identified. Roles may entitle several permissions. Roles can be used to identify privilege information. For example, as shown in method 300 of the flowchart in FIG. 3, privileges are identified from existing privilege roles (block 302). The existing privilege roles may then be removed (block 304) or discarded from the privilege information or analysis workspace. The identified privileges may then be associated with the respective users of the privilege roles for future analysis.

Users of the plurality of users with similar events are identified (block 206). Events are determined to be similar when the events have common characteristics that satisfy rules for determining similarity. Users may have one or more events in common. These events may be the same or similar in name or effect. Events may share common characteristics that are determined to be similar by defined similarity rules. The privileges of these users with similar events are analyzed. For example, a privilege may be common to users with similar events.

The event information and privilege information are compared for the users with similar events (block 208). One or more of these similar events may be mapped to the privilege based on the comparisons (block 210). In some cases, an event may be common to multiple privileges. An event-privilege mapping may be generated. This may be a conceptual mapping or a mapping captured by stored, displayed or transmitted information.

The event-privilege mapping may be used to calculate privilege usage (block 212). Now that events are correlated with privileges, privilege-level usage analysis may be performed to determine if changes to privilege assignments or privilege protocol are necessary. For example, if one user uses sensitive privileges more than others, this might be a security issue. In another example, behavioral patterns of privilege usage may be detected for statistical analysis.

Figure 5:
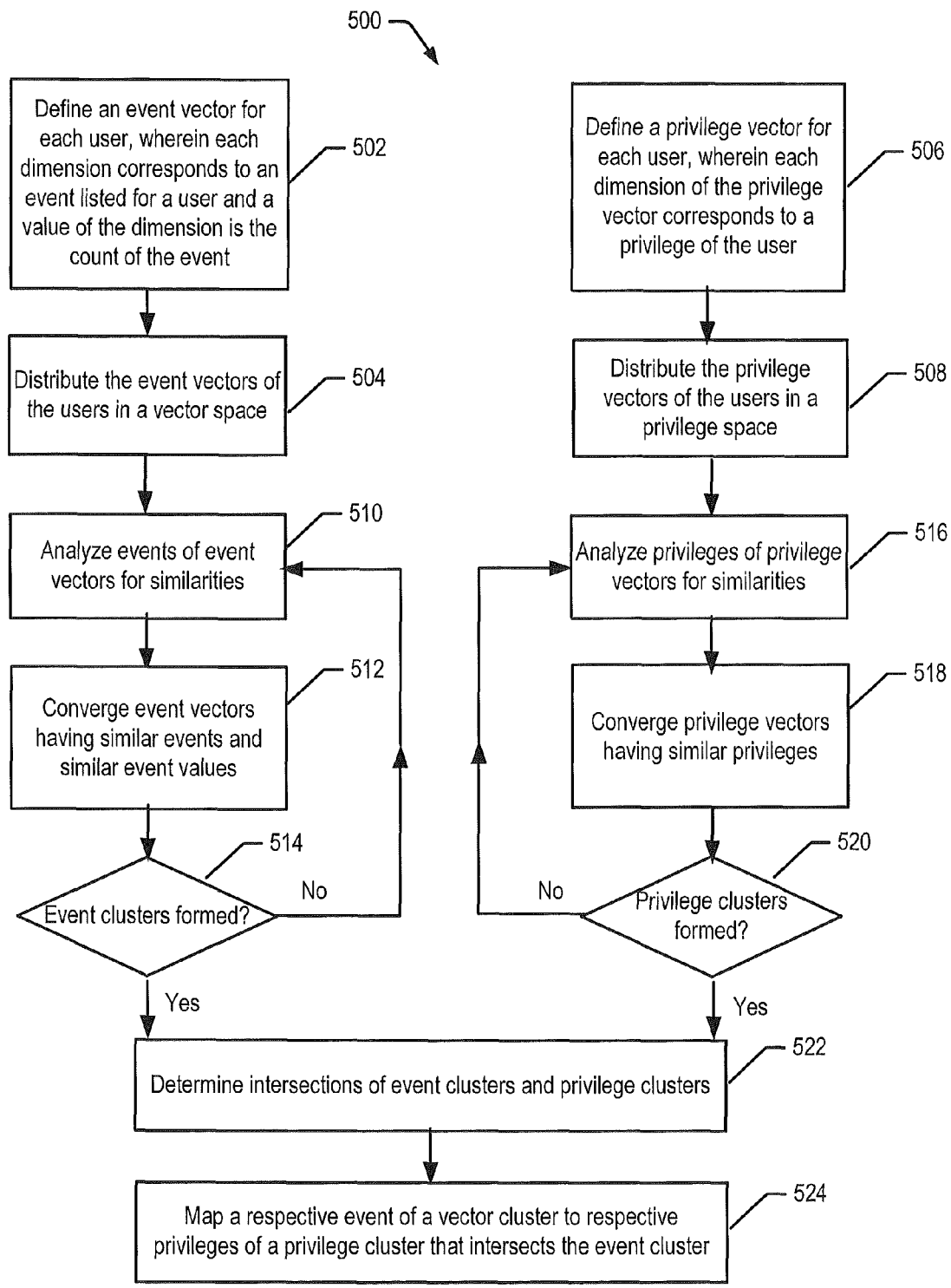

With heterogeneous systems, similarities may be difficult to detect and links between events and privileges may be difficult to form. According to another embodiment, another pattern finding algorithm may be used by event-privilege mapper 116. An example pattern finding algorithm is shown by method 500 in FIG. 5. The data mining algorithm may be generally executed once a sufficient amount of event data has been gathered. Running the algorithm may only be required once or at least with large time intervals.

The algorithm shown by method 500 indentifies users who are similar and have similar privileges. Meaning, users who have some repeating characteristic are also repeatedly showing some subset of privileges. If seen on a large enough dataset, this gives an indication that there is a correlation between the characteristic and the privileges.

The algorithm does not have to use exact criterion, such as 'everyone with title X get privilege Y'. Rather, the strength of the algorithm is with having loose criteria. For example, the result of the algorithm would be 'almost everyone who has title X gets most of the privileges A, B and C'. The algorithm accepts the tolerance, which is usually above 90% matching. This means that even if there are outliers, such as a single person with the title that does not have the privileges, this will not break the identification of the pattern, as it is still relevant. In most cases, the person is the problem, not the pattern. The algorithm identifies similarities between users. The algorithm detects that a group of users are 'close' to each other.

In example method 500, an event vector is defined for each user (block 502). An event vector may be a mathematical vector with associated properties. For example, if the vector has 10 properties or attributes (events), the user will show as a 10 dimension vector. Each dimension of the vector corresponds to an event that was listed for a user. Each event may be a unique event and the value of the event may be the count of the number of times the specific event is logged for the user.

Figure 6:
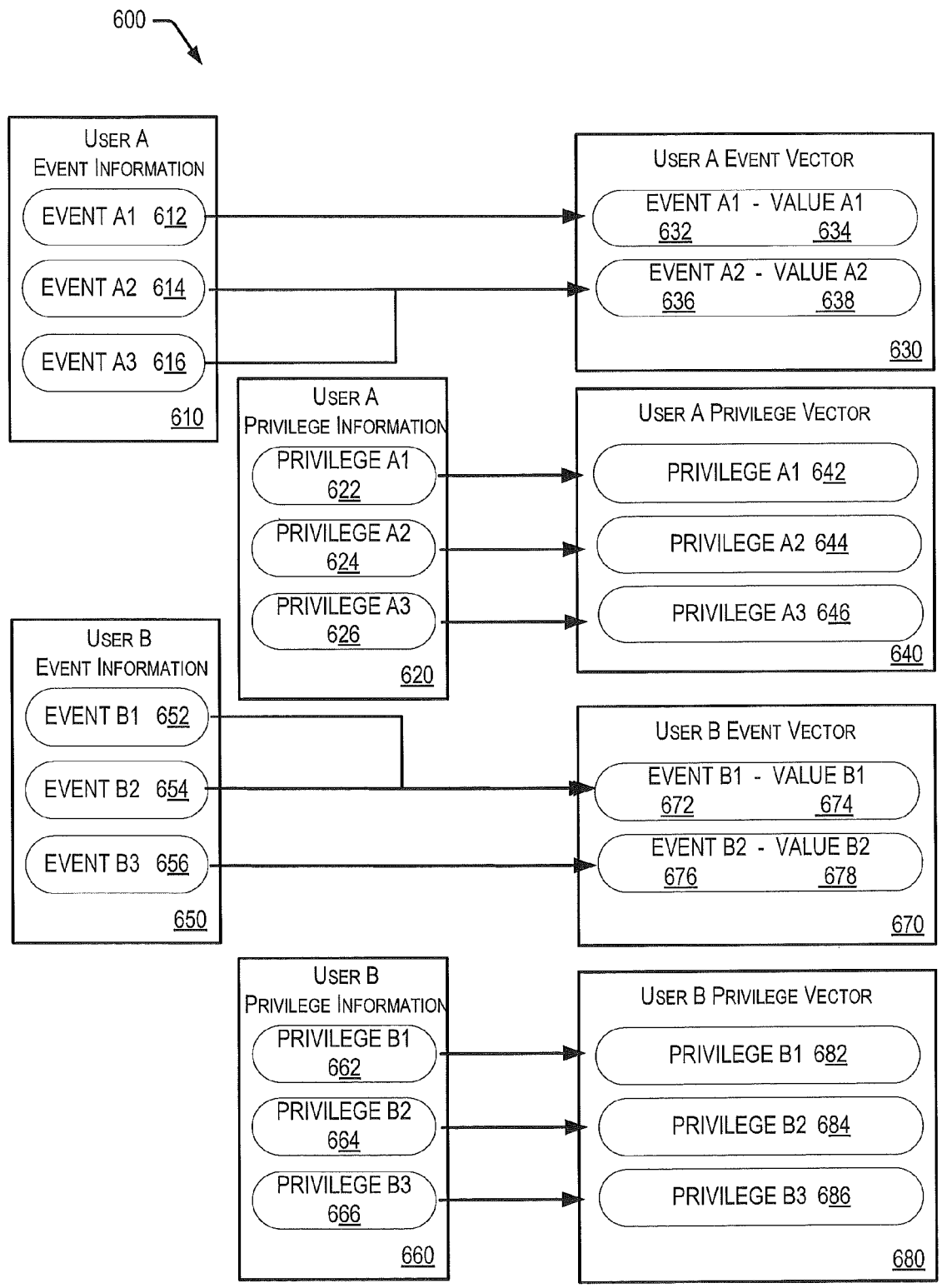
FIG. 6 is a block diagram illustrating example event vectors and privilege vectors used in embodiments for analyzing privilege usage.

FIG. 6 is a diagram 600 showing a conversion of identified event and privilege information into event and privilege vectors. Event identifier 112 provides event information 610 of user A and event information 650 of user B. As shown by FIG. 6, events A1, A2 and A3 (respectively 612, 614 and 616) are identified events from event information 610. These events become events of event vector 630 for user A. Event A1 612 is unique and becomes event A1 632. Event A2 614 is unique and becomes event A2 636. There is one event A1 612 so value A1 634 receives the count value of 1. Event A2 614 and event A3 616 are the same (or similar) events so event A2 636 represents both events A2 614 and A3 616. Value A2 638 receives the count value of 2.

Events B1, B2 and B3 (respectively 652, 654 and 656) are identified events from event information 650 of user B. These events become events of event vector 670, event B1 672 with a value B1 674 of 2 and event B2 676 with a value B2 678 of 1.

A privilege vector for each user may be defined (block 506). Each dimension of the privilege vector may be a privilege that corresponds to a privilege of a user. As shown by FIG. 6, privileges A1, A2 and A3 (respectively 622, 624 and 626) are privileges identified by privilege identifier 114. These privileges become respective privileges A1-A3 (642-646) of privilege vector 640 for user A.

Similarly, the events B1-B3 652-656 of event information 650 become events B1 672 and B2 676 of event vector 670 for user B. Event value B1 674 is 2 and value B2 678 is 1. Privileges B1, B2 and B3 (respectively 662, 664 and 666) of privilege information 660 become respective privileges B1-B3 (682-686) of privilege vector 680 for user B.

Figure 9A:
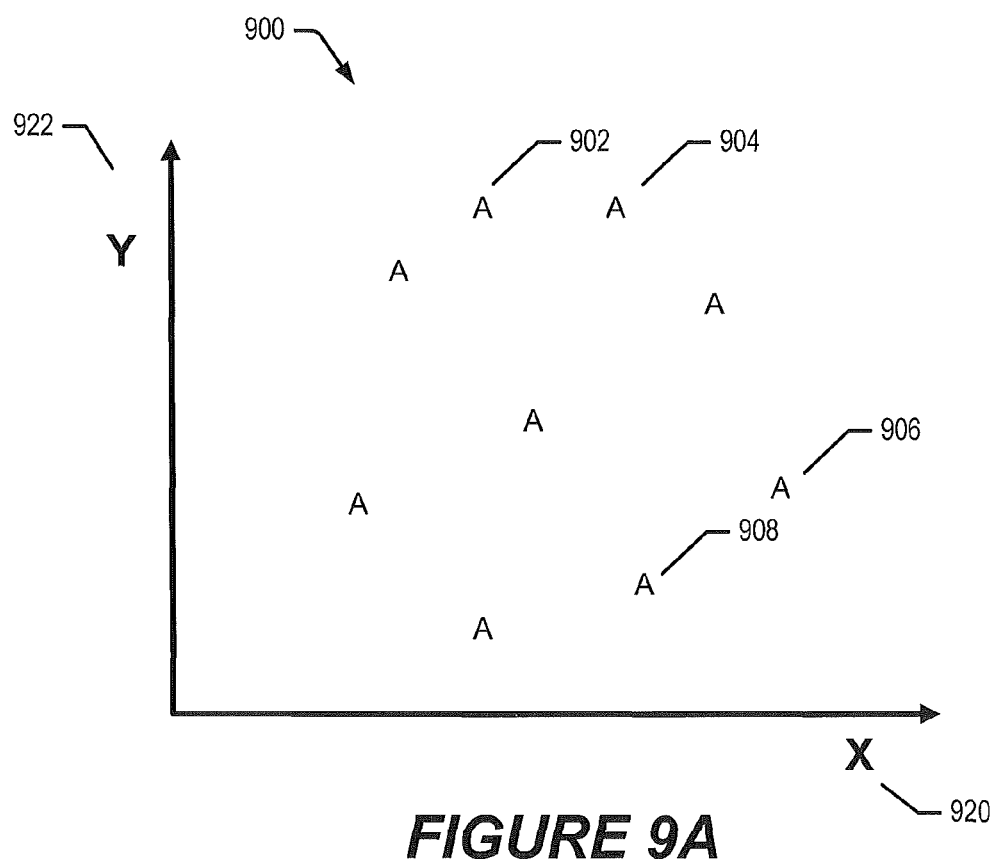
FIGS. 9A-9D illustrate representations of event and privilege vectors in event and privilege spaces.

Once the event vector is defined for every user, they are distributed in an event space (block 504). The event space may be a large dataset that could be visually represented by graph 900 in FIG. 9A. The X 920 and Y 922 axes may represent certain fields such as user information or event details. Event vectors, such as event vectors 902-908, are shown to be distributed throughout the event space. In some cases, the initial distribution may be random. In other cases, they may be apportioned according to user or event type. This visual representation is for descriptive purposes. If there are more than two dimensions, visual representations may be difficult to illustrate.

Figure 9B:
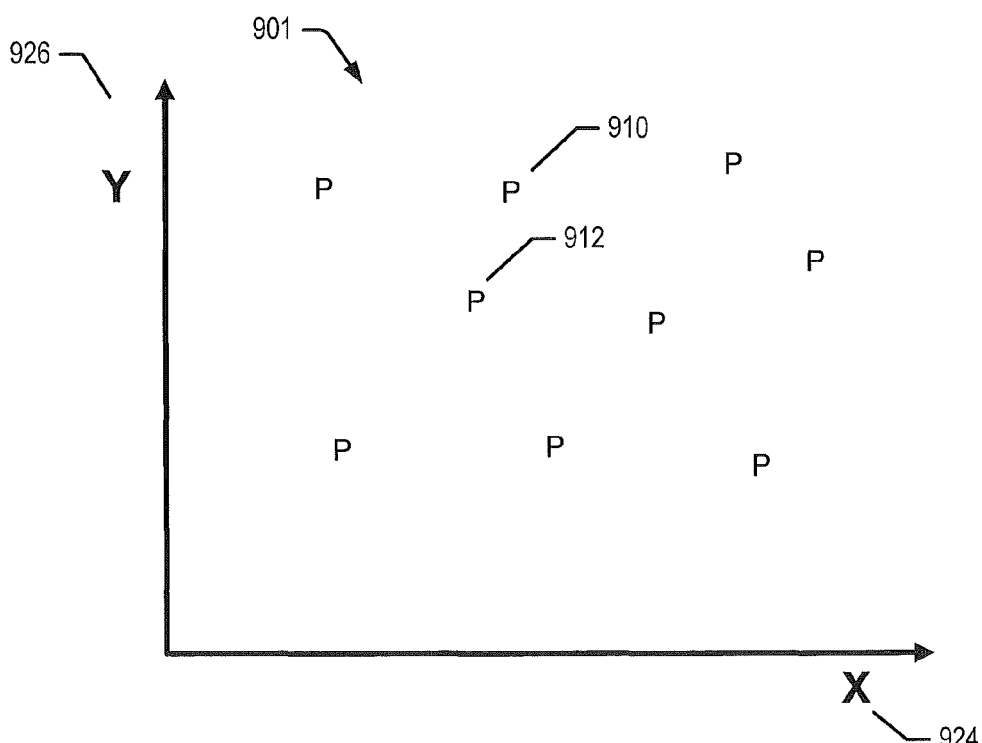

Similarly, the privilege vectors are distributed in a privilege space (block 508). The privilege space may be a large dataset that could be visually represented by graph 901 in FIG. 9B. The X 924 and Y 964 axes may represent certain fields such as user information or privilege or resource details. Privilege vectors, such as privilege vectors 910 and 912, are shown to be distributed throughout the privilege space. In some cases, the initial distribution may be random. In other cases, they may be apportioned according to user, privilege or resource. In other embodiments, the event and privilege vectors may be represented in the same graph.

Blocks 510 and 512 are part of an iterative process that causes similar vectors to converge closer together. At the start, the users are distributed in the space, but each iteration brings similar user vectors closer together. Users who share similarities will cluster together. In some cases, the algorithm stops when there are clear clusters showing. In other cases, the algorithm stops when additional iterations are not producing better convergence. Various rules or thresholds for completing the iterations may be defined.

For example, events of event vectors are analyzed for similarities (block 510). Event values may also be analyzed. If the events, and perhaps event counts, are similar, the vectors converge closer together (block 512). If certain files are accessed a similar amount of times over a time period by multiple users, these users may have similar roles or duties that may be reflected by their privileges.

Comparisons may be made between users having not only similar events, but similar counts of the events, according to an embodiment. Comparisons may be made between users who execute the same event but at different usage amounts. For example, a user that executes an event 5 times should be closer to a user that executes the same event 6 times, than a user that executes the event 20 times. A comparison can find similarities between users who just have a non-zero count value, but the results will be more accurate if similar count values are considered.

Figure 4:
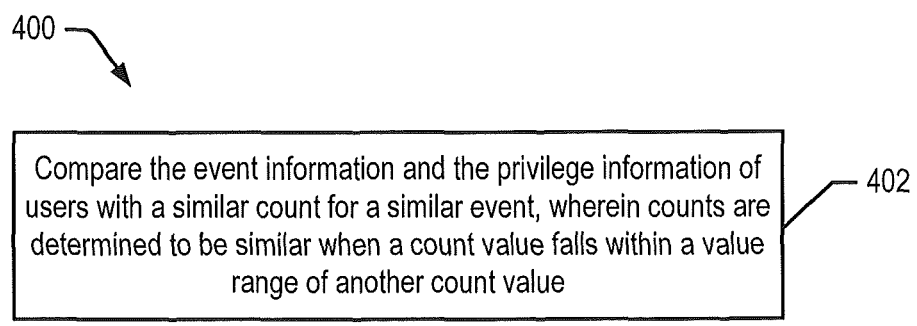

According to an aspect, method 400 of FIG. 4 illustrates comparing event information and privilege information of users with a similar count for a similar event (block 402 of FIG. 4). In some cases, similar counts may be found by finding counts that fall within a certain value range of another. For example, a count of 5 may be assigned a value range of plus or minus 2. A count of 6 falls within this range as it is less than 7. It can be considered to be a similar count.

The privilege vector analysis occurs in parallel with a similar iterative process. Privileges are analyzed for similarities (block 516). For example, similarities in privileges may be detected based on resources available to a privilege, the number of users in an organization that have the privilege relative to others, the length of employment of a user, the title of a user, or other user, privilege and resource information. Privileges may be similar if they share common characteristics that are determined to be similar by defined similarity rules. Privilege vectors having similar privileges converge (block 518).

Figure 9C:
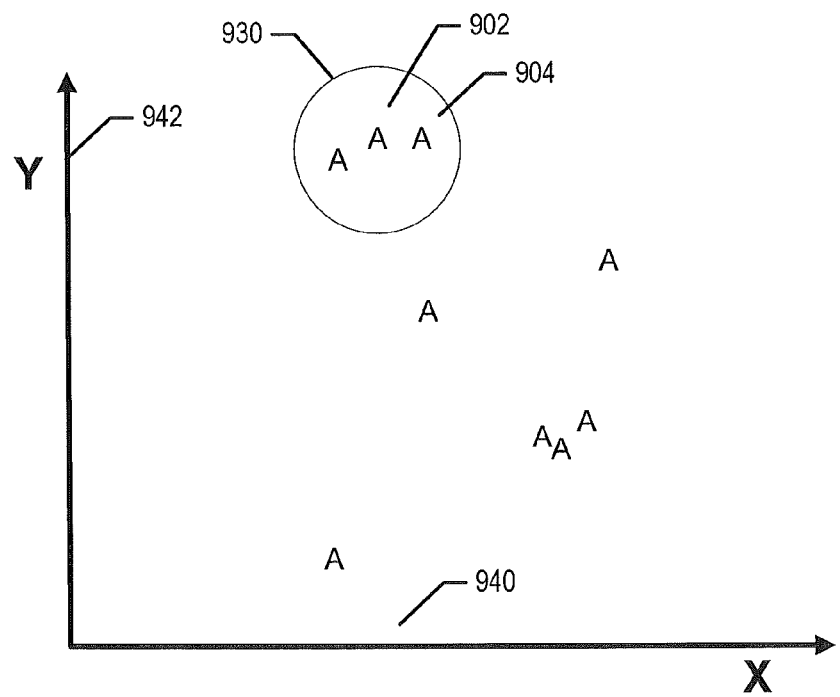
Figure 9D:
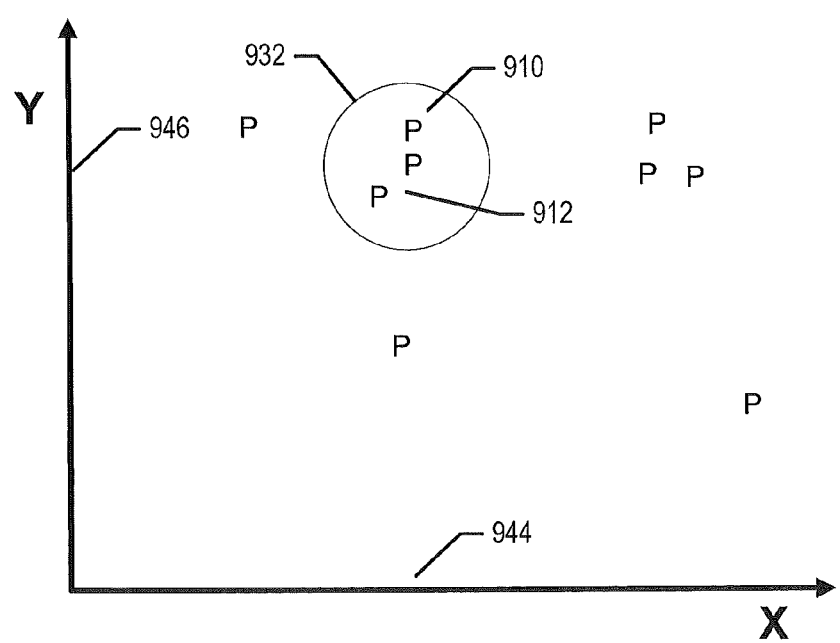

When event clusters or privilege clusters form (blocks 514 and 520), the iterative processes of 510-512 or 516-518 conclude. Clusters may be formed or defined by common mathematical principles or by defined parameters. In this example embodiment, event cluster 930 (FIG. 9C) formed as event vectors 902 and 904 converged with another event vector. Also, privilege cluster 932 (FIG. 9D) formed as privilege vectors 910 and 912 converged with another privilege vector.

Intersections of event and privilege clusters are determined (block 522). This may involve portions of the clusters overlapping. This may occur when both event and privilege vectors for intersections have the same users. For example, an event cluster may contain the event vectors of users A, B and C. A privilege cluster may contain the vectors of users A, B, D and E. In this case, the intersection between the two clusters is because of users A and B. The larger the intersection, the better the correlation. Respective events of the event vectors and respective privileges of the privilege vectors are identified. The respective events are mapped to the respective privileges to form the event-privilege mapping (block 524).

Figure 7:
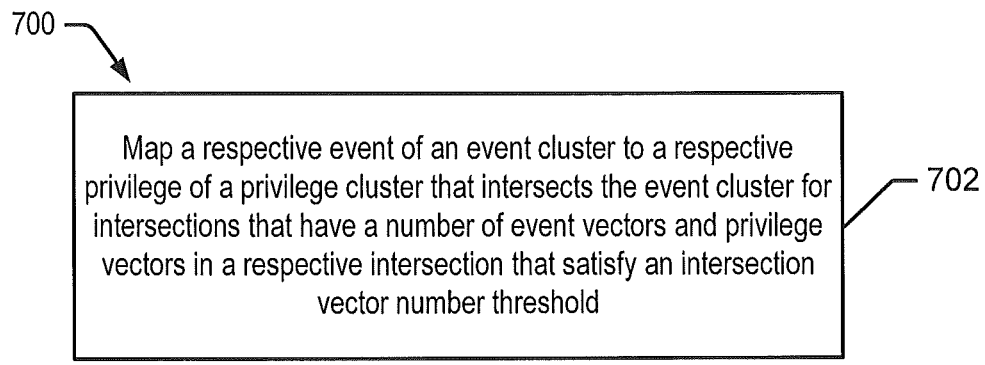
FIGS. 7-8 are flowcharts that further illustrate example methods for analyzing privilege usage.

In a further embodiment, a respective event of an event cluster may be mapped to a respective privilege of a privilege cluster that intersects the event cluster for intersections that have a number of event vectors and privilege vectors in a respective intersection that satisfy an intersection vector number threshold, as shown by block 702 of method 700 in FIG. 7. A threshold may be satisfied if a minimum number of vectors are present in a cluster or intersection. This may help to focus on intersections having enough vectors or clusters to be significantly different over the rest of the field. Otherwise, many intersections with poor sampling can make analysis difficult.

However, in some cases, the small samples may be specifically targeted for anomalies. In these cases, the threshold may be satisfied when the number of vectors or clusters is below a set threshold number.

The resulting event-privilege mapping may be used for privilege usage analysis. For example, information calculated from the mapping may help a certification or business professional remove unused resources from certain employees. It may also help identify a security issue if one user uses sensitive privileges more than others of a similar station in the organization.

Figure 8:
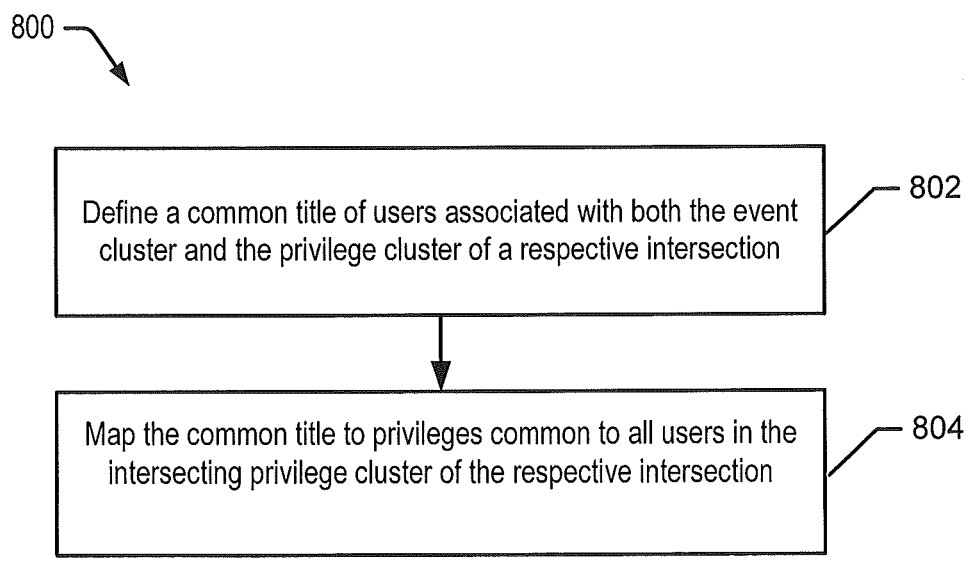

For example, FIG. 8 shows a specific method 800 for determining a useful event property and any associated common privileges. A common title is defined of users associated with both the event cluster and the privilege cluster of a respective intersection (block 802). The title is an event or a property or attribute of a user derived from an event of event vectors in an event cluster of an intersection. The title is considered to be common among users of the event cluster of the intersection when the title is the same or determined to be similar.

The common title is mapped to privileges common to all users in the intersecting privilege cluster of the respective intersection (block 804). That is, the privileges of the privilege vectors of a privilege cluster of the intersection may be the same or similar among the different privilege vectors. Those privileges common to all (or a determined majority or percentage of the vectors) privilege vectors of the intersection are linked to the common title.

For example, the title found in the event vectors of the intersection is "report usage." Other titles may be for other types of events. In some cases, a title may be a user job title. Privileges for some privilege vectors of the intersection may be, for example, "view customers", "print" and "generate report". For other privilege vectors of the intersection, the privileges may be "view customers" and "print". Therefore, the common privileges linked to "report usage" in the event-privilege mapping for the intersection are "view customers" and "print".

In another implementation, the functionality of system 110 may be provided through a browser on a computing device. The browser may be any commonly used browser, including any multithreading browser. System 110 may be software in a browser or software displayed by the browser. System 110 may be software hosted by a server and served to client devices over a network.

The embodiments described herein provide for a system wide privilege usage analysis not otherwise possible due to the disconnect between event log information and privileges and the heterogeneous nature of the events and privileges across different portions of the system.

As will be appreciated by one of skill in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 10:
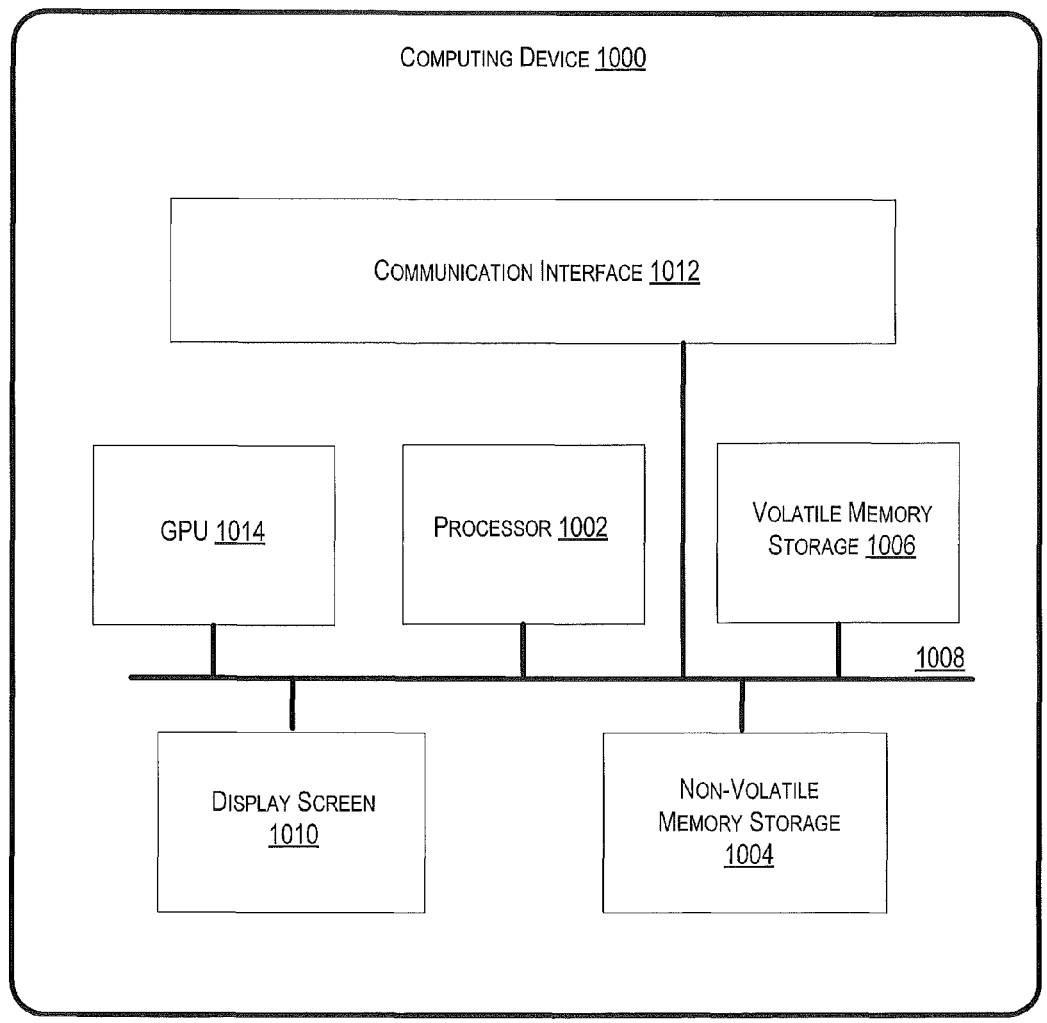
FIG. 10 is a block diagram of a computing device in which embodiments can be implemented.

FIG. 10 is an example computer system 1000 in which embodiments of the present disclosure, or portions thereof, may be implemented as computer-readable code. For example, the components of privilege analysis system 110 may be implemented in one or more computer devices 1000 using hardware, software implemented with hardware, firmware, tangible computer-readable storage media having instructions stored thereon, or a combination thereof and may be implemented in one or more computer systems or other processing systems. Components and methods in FIGS. 1-9 may be embodied in any combination of hardware and software.

Computing device 1000 may include one or more processors 1002, one or more non-volatile storage mediums 1004, one or more memory devices 1006, a communication infrastructure 1008, a display screen 1010 and a communication interface 1012. Computing device 1000 may also have networking or communication controllers, input devices (keyboard, a mouse, touch screen, etc.) and output devices (printer or display).

Processor(s) 1002 are configured to execute computer program code from memory devices 1004 or 1006 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 1014 is a specialized processor that executes instructions and programs, selected for complex graphics and mathematical operations, in parallel.

Non-volatile storage 1004 may include one or more of a hard disk drive, flash memory, and like devices that may store computer program instructions and data on computer-readable media. One or more of non-volatile storage device 1004 may be a removable storage device.

Memory devices 1006 may include one or more volatile memory devices such as but not limited to, random access memory. Communication infrastructure 1008 may include one or more device interconnection buses such as Ethernet, Peripheral Component Interconnect (PCI), and the like.

Typically, computer instructions are executed using one or more processors 1002 and can be stored in non-volatile storage medium 1004 or memory devices 1006.

Display screen 1010 allows results of the computer operations to be displayed to a user or an application developer.

Communication interface 1012 allows software and data to be transferred between computer system 1000 and external devices. Communication interface 1012 may include a modem, a network interface (such as an Ethernet card), a communications port, a PCMCIA slot and card, or the like. Software and data transferred via communication interface 1012 may be in the form of signals, which may be electronic, electromagnetic, optical, or other signals capable of being received by communication interface 1012. These signals may be provided to communication interface 1012 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described embodiments or any actual software code with the specialized control of hardware to implement such embodiments, but should be defined only in accordance with the following claims and their equivalents.

What is claimed is:

1. A computer system comprising:
   for each respective user of a plurality of users,
      an event identifier to identify event information of the respective user, wherein an event is a recorded user action on a computer system and event information comprises a list of events that correspond to actions of the respective user and a count of each listed event, and
      a privilege identifier to identify privilege information of the respective user, wherein a privilege is a computer setting indicating what access or control of a computer system is available to the respective user and the privilege information comprises a list of privileges of the respective user; and
   an event-privilege mapper implemented with a computing device to:
      identify users of the plurality of users with similar events, wherein events are determined to be similar when the events have common characteristics that satisfy rules for determining similarity;
      compare the event information and the privilege information of the identified users of the plurality of users with similar events; and
      map events to privileges based on the comparison of the event information and the privilege information of the identified users of the plurality of users with similar events.

2. The system of claim 1, wherein the event-privilege mapper is further configured to calculate privilege usage data for each respective user of the plurality of users based on the comparison of the event information and the privilege information of the identified users of the plurality of users with similar events.

3. The system of claim 1, wherein the privilege identifier is further configured to resolve privilege roles of the respective user to separately identify the privilege information of the respective user.

4. The system of claim 1, wherein the event-privilege mapper is further configured to compare the event information and the privilege information of users of the plurality of users with a similar count for a similar event, wherein counts are determined to be similar when a count value falls within a value range of another count value.

5. The system of claim 1, wherein the event-privilege mapper is further configured to:
   define an event vector for each respective user, wherein each dimension of the event vector corresponds to an event listed among the list of events identified for the respective user and a value of the dimension is the count of the event listed among the list of events;

distribute the event vectors of the plurality of users in an event space;

perform event analysis over a plurality of iterations, wherein each iteration of the event analysis comprises:
  analyzing the events of the event vectors for similarities; and
  converging the event vectors having similar events and similar values of the dimensions of the event vector;

define a privilege vector for each respective user of the plurality of users, wherein each dimension of the privilege vector corresponds to a privilege listed among the list of privileges identified for the respective user;

distribute the privilege vectors of the plurality of users in a privilege space;

perform privilege analysis over a plurality of iterations, wherein each iteration of the privilege analysis comprises:
  analyzing the privileges of the privilege vectors for similarities; and
  converging the privilege vectors having similar privileges; and upon formation of event clusters of event vectors in the event space and privilege clusters of privilege vectors in the privilege space, determine intersections of the event clusters and privilege clusters, wherein the intersections are used to map a respective event of an event cluster to a respective privilege of a privilege cluster that intersects the event cluster.

6. The system of claim 5, wherein the event-privilege mapper is further configured to map a respective event of an event cluster to a respective privilege of a privilege cluster that intersects the event cluster for intersections that have a number of event vectors and a number of privilege vectors in a respective intersection that satisfy an intersection vector number threshold.

7. The system of claim 5, wherein the event-privilege mapper is further configured to:
  define a common title of users of the plurality of users associated with both the event cluster and the privilege cluster of a respective intersection; and
  map the common title of users to privileges common to all users of the plurality of users in the intersecting privilege cluster of the respective intersection.

8. A computer-implemented method for analyzing privilege usage within a computer system, comprising:
  for each respective user of a plurality of users,
    identifying event information of the respective user, wherein an event is a recorded user action on a computer system and event information comprises a list of events that correspond to actions of the respective user and a count of each listed event, and
    identifying privilege information of the respective user, wherein a privilege is a computer setting indicating what access or control of a computer system is available to the respective user and the privilege information comprises a list of privileges of the respective user;
  identifying users of the plurality of users with similar events, wherein events are determined to be similar when the events have common characteristics that satisfy rules for determining similarity;
  comparing, with a computing device, the event information and the privilege information of the identified users of the plurality of users with similar events; and
  mapping events to privileges based on the comparison of the event information and the privilege information of the identified users of the plurality of users with similar events.

9. The method of claim 8, further comprising calculating privilege usage data for each respective user of the plurality of users based on the comparison of the event information and the privilege information of the identified users of the plurality of users with similar events.

10. The method of claim 8, wherein identifying privilege information of the respective user comprises resolving privilege roles of the respective user to separately identify the privilege information of the respective user.

11. The method of claim 8, wherein comparing the event information and the privilege information further comprises comparing the event information and the privilege information of users of the plurality of users with a similar count for a similar event, wherein counts are determined to be similar when a count value falls within a value range of another count value.

12. The method of claim 8, wherein the mapping further comprises:
  defining an event vector for each respective user of the plurality of users, wherein each dimension of the event vector corresponds to an event listed among the list of events identified for the respective user and a value of the dimension is the count of the event listed among the list of events;
  distributing the event vectors of the plurality of users in an event space;
  performing event analysis over a plurality of iterations, wherein each iteration of the event analysis comprises:
    analyzing the events of the event vectors for similarities; and
    converging the event vectors having similar events and similar values of the dimensions of the event vector;
  defining a privilege vector for each respective user of the plurality of users, wherein each dimension of the privilege vector corresponds to a privilege listed among the list of privileges identified for the respective user;
  distributing the privilege vectors of the plurality of users in a privilege space;
  performing privilege analysis over a plurality of iterations, wherein an iteration of the privilege analysis comprises:
    analyzing the privileges of the privilege vectors for similarities; and
    converging the privilege vectors having similar privileges; and
  upon formation of event clusters of event vectors in the event space and privilege clusters of privilege vectors in the privilege space, determining intersections of the event clusters and privilege clusters, wherein the intersections are used to map a respective event of an event cluster to a respective privilege of a privilege cluster that intersects the event cluster.

13. The method of claim 12, further comprising mapping a respective event of an event cluster to a respective privilege of a privilege cluster that intersects the event cluster for intersections that have a number of event vectors and a number of privilege vectors in a respective intersection that satisfy an intersection vector number threshold.

14. The method of claim 12, wherein the mapping further comprises:
  defining a common title of users of the plurality of users associated with both the event cluster and the privilege cluster of a respective intersection; and mapping the common title to privileges common to all users of the plurality of users in the intersecting privilege cluster of the respective intersection.

15. A computer program product for operating a computer system including a plurality of managed machines that use resources of the computer system, the computer program product comprising:
 a non-transitory computer readable storage medium having computer readable program code embodied in the medium, the computer readable program code comprising:
  for each respective user of a plurality of users,
   computer readable program code to identify event information of the respective user, wherein an event is a recorded user action on a computer system and event information comprises a list of events that correspond to actions of the respective user and a count of each listed event, and
   computer readable program code to identify privilege information of the respective user, wherein a privilege is a computer setting indicating what access or control of a computer system is available to the respective user and the privilege information comprises a list of privileges of the respective user;
  computer readable program code to identify users of the plurality of users with similar events, wherein events are determined to be similar when the events have common characteristics that satisfy rules for determining similarity;
  computer readable program code to compare the event information and the privilege information of the identified users of the plurality of users with similar events; and
  computer readable program code to map events to privileges based on the comparison of the event information and the privilege information of the identified users of the plurality of users with similar events.

16. The computer program product of claim 15, further comprising:
 computer readable program code to calculate privilege usage data for each respective user of the plurality of users based on the comparison of the event information and the privilege information of the identified users of the plurality of users with similar events.

17. The computer program product of claim 15, further comprising:
 computer readable program code to compare the event information and the privilege information of users of the plurality of users with a similar count for a similar event, wherein counts are determined to be similar when a count value falls within a value range of another count value.

18. The computer program product of claim 15, further comprising:
 computer readable program code to define an event vector for each respective user of the plurality of users, wherein each dimension of the event vector corresponds to an event listed among the list of events identified for the respective user and a value of the dimension is the count of the event listed among the list of events;
 computer readable program code to distribute the event vectors of the plurality of users in an event space;
 computer readable program code to perform event analysis over a plurality of iterations, wherein each iteration of the event analysis comprises:
  analyzing the events of the event vectors for similarities; and
  converging the event vectors having similar events and similar values of the dimensions of the event vector;
 computer readable program code to define a privilege vector for each respective user of the plurality of users, wherein each dimension of the privilege vector corresponds to a privilege listed among the list of privileges identified for the respective user;
 computer readable program code to distribute the privilege vectors of the plurality of users in a privilege space;
 computer readable program code to perform privilege analysis over a plurality of iterations, wherein each iteration of the privilege analysis comprises:
  analyzing the privileges of the privilege vectors for similarities; and
  converging the privilege vectors having similar privileges; and
 computer readable program code to, upon formation of event clusters of event vectors in the event space and privilege clusters of privilege vectors in the privilege space, determine intersections of the event clusters and privilege clusters, wherein the intersections are used to map a respective event of an event cluster to a respective privilege of a privilege cluster that intersects the event cluster.

19. The computer program product of claim 18, further comprising computer readable program code to map a respective event of an event cluster to a respective privilege of a privilege cluster that intersects the event cluster for intersections that have a number of event vectors and privilege vectors in a respective intersection that satisfy an intersection vector number threshold.

20. The computer program product of claim 18, further comprising:
 computer readable program code to define a common title of users of the plurality of users associated with both the event cluster and the privilege cluster of a respective intersection; and
 computer readable program code to map the common title to privileges common to all users of the plurality of users in the intersecting privilege cluster of the respective intersection.

* * * * *